(12) United States Patent
Herman et al.

(10) Patent No.: US 10,771,665 B1
(45) Date of Patent: Sep. 8, 2020

(54) DETERMINATION OF ILLUMINATOR OBSTRUCTION BY KNOWN OPTICAL PROPERTIES

(71) Applicant: Ford Global Technologies, LLC, Dearborn, MI (US)

(72) Inventors: David Michael Herman, Oak Park, MI (US); Ashwin Arunmozhi, Canton, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/287,672

(22) Filed: Feb. 27, 2019

(51) Int. Cl.
*H04N 5/217* (2011.01)
*B60R 1/00* (2006.01)
(Continued)

(52) U.S. Cl.
CPC ............. *H04N 5/2256* (2013.01); *B60R 1/00* (2013.01); *G06K 9/00791* (2013.01);
(Continued)

(58) Field of Classification Search
CPC .. H04N 5/2256; H04N 5/2171; H04N 5/2254; G06K 9/00791; G06K 9/00812; G06K 9/00818; G06K 9/00825; G06K 9/00832; G06K 9/00838; G06K 9/00845; G06K 9/00798; G06K 9/00805; B65G 2203/04; B65G 2203/041; G06T 2207/30268; G06T 2207/30236; G06T 2207/30248; G06T 2207/30252;
(Continued)

(56) References Cited

U.S. PATENT DOCUMENTS 7,271,880 B2    9/2007  Samukawa et al.
9,126,534 B2 *  9/2015  Snider ................... B60S 1/0848
(Continued)

FOREIGN PATENT DOCUMENTS

EP    1498721 A1 *  1/2005  ............. B60Q 1/143
JP    2006078452 A *  3/2006
(Continued)

OTHER PUBLICATIONS

Hiscocks, "Measuring Luminance with a Digital Camera" (25 pages).
(Continued)

*Primary Examiner* — Christopher S Kelley
*Assistant Examiner* — Kathleen M Walsh
(74) *Attorney, Agent, or Firm* — Frank A. MacKenzie; Bejin Bieneman PLC

(57) ABSTRACT

A vehicle includes an image sensor having a field of view, an illuminator aimed at the field of view; and a computer including a processor and a memory storing instructions executable by the processor. The computer is programmed to illuminate an object external to the vehicle; determine that the object has a known optical property; determine the optical property of the object from a database; calculate luminance of the illuminator based at least on the optical property of the object; and adjust at least one of the illuminator, the image sensor, and the computer based at least on the luminance of the illuminator.

20 Claims, 5 Drawing Sheets

(51) Int. Cl.
*H04N 5/225* (2006.01)
*G06K 9/00* (2006.01)

(52) U.S. Cl.
CPC ......... *H04N 5/2171* (2013.01); *H04N 5/2254* (2013.01); *B60R 2300/103* (2013.01)

(58) Field of Classification Search
CPC . G06T 2207/30256; G06T 2207/30261; G06T 2207/30264; G08B 13/19647; G08B 13/1965; G08G 1/167; B60R 1/00; B60R 2300/103; B60R 1/002; B60R 1/005; B60R 1/007; B60R 11/04; B60R 21/01538; B60R 25/1012; B60R 25/1018; B60R 25/102; B60R 25/30; B60R 25/305; B60R 2001/1253; B60R 2025/1013; B60R 2025/1016; B60R 2300/00; B60R 2300/10; B60R 2300/101; B60R 2300/102; B60R 2300/105; B60R 2300/106; B60R 2300/107; B60R 2300/108; B60R 2300/202; B60R 2300/205; B60R 2300/207; B60R 2300/30; B60R 2300/301; B60R 2300/302; B60R 2300/303; B60R 2300/304; B60R 2300/305; B60R 2300/306; B60R 2300/307; B60R 2300/308; B60R 2300/60; B60R 2300/602; B60R 2300/605; B60R 2300/607; B60R 2300/70; B60R 2300/80; B60R 2300/8006; B60R 2300/8013; B60R 2300/802; B60R 2300/8026; B60R 2300/8033; B60R 2300/804; B60R 2300/8053; B60R 2300/806; B60R 2300/8066; B60R 2300/8073; B60R 2300/808; B60R 2300/8086; B60R 2300/8093; B60R 2203/04; B60R 2203/041; A61B 5/18; B60K 2370/21; B60L 53/37; B60Q 9/005
USPC ........................................................ 348/148
See application file for complete search history.

(56) References Cited

U.S. PATENT DOCUMENTS

| | | | |
|---|---|---|---|
| 9,319,637 B2* | 4/2016 | Lu | H04N 7/18 |
| 9,335,264 B2 | 5/2016 | Kroekel et al. | |
| 9,445,057 B2* | 9/2016 | May | H04N 7/18 |
| 9,607,242 B2* | 3/2017 | Lavoie | G06T 7/74 |
| 10,035,498 B2 | 7/2018 | Richardson et al. | |
| 2002/0106109 A1* | 8/2002 | Retterath | G01S 17/06 382/104 |
| 2003/0107669 A1* | 6/2003 | Ito | H04N 5/2354 348/370 |
| 2014/0009615 A1 | 1/2014 | Kiyohara et al. | |
| 2015/0069224 A1* | 3/2015 | Yoshimura | B60S 1/0833 250/227.14 |
| 2015/0145956 A1* | 5/2015 | Hayakawa | G06K 9/00791 348/46 |
| 2015/0161457 A1* | 6/2015 | Hayakawa | G08G 1/166 348/46 |
| 2015/0169967 A1* | 6/2015 | Nakamura | G06K 9/03 382/104 |
| 2015/0177512 A1* | 6/2015 | Hayakawa | G02B 27/0006 348/148 |
| 2016/0341848 A1* | 11/2016 | Nakamura | G01V 8/12 |
| 2017/0034459 A1* | 2/2017 | Matsimanis | H04N 5/2171 |
| 2017/0180615 A1* | 6/2017 | Lautenbach | H04N 5/2257 |
| 2017/0270375 A1* | 9/2017 | Grauer | G06K 9/6293 |
| 2018/0253609 A1* | 9/2018 | Potter | B60Q 1/08 |
| 2019/0174029 A1* | 6/2019 | Mandai | H04N 5/2171 |
| 2019/0202355 A1* | 7/2019 | Tatara | B60R 1/06 |
| 2019/0208111 A1* | 7/2019 | Wendel | H04N 5/23218 |

FOREIGN PATENT DOCUMENTS

| | | | | |
|---|---|---|---|---|
| JP | 4437750 B2 | 3/2010 | | |
| JP | 2012171536 A | 9/2012 | | |
| KR | 101527810 B1 | 6/2015 | | |
| WO | WO-2004007255 A2 * | 1/2004 | ............ | B60S 1/0822 |
| WO | WO-2018127789 A1 * | 7/2018 | ............ | G01S 7/4873 |

OTHER PUBLICATIONS

Wang, et al., "A Universal Image Quality Index", IEEE Signal Processing Letters, vol. XX, No. Y (Mar. 2002) (Abstract only) retrieved from Internet URL: https://ieeexplore.ieee.org/document/1709988 (4 pages).
Sheikh, et al., "A Statistical Evaluation of Recent Full Reference Image Quality Assessment Algorithms", (Abstract only), IEEE Transaction on Image Processing, vol. 15, Issue 11 (1 page).
3M, "Reflectivity: How We See", 3M Traffic Safety Systems Division (2004) (2 pages).
Wang, et al., "Multi-Scale Structural Similarity for Image Quality Assessment", published in Proceedings of the 37th IEEE Asilomar Conference on Signals, Systems and Computers, Pacific Grove, CA, Nov. 9-12, 2003 (5 pages).
Wang, et. al., "Image Quality Assessment: From Error Visibility to Structural Similarity", IEEE Transaction on Image Processing, vol. 13, No. 4 (Apr. 2004) (14 pages).
Mittal, et. al., "No-Reference Image Quality Assessment in the Spatial Domain", IEEE Transactions on Image Processing, vol. 21, No. 12 (Dec. 2012) (14 pages).
Wueller, et. al., "The Usage of Digital Cameras as Luminance Meters", Digital Photography III, SPIE-IS&T Electronic Imaging, SPIE vol. 6502 (2007) (11 pages).
Guenther, et. al., Efficient Acquisition and Realistic Rendering of Car Paint, (Jan. 2005) retrieved from Internet URL: https://www.researchgate.net/publication/47861638 (10 pages).
Wetherill, et. al., "Statistical Process Control: Theory and Practice", 3rd Edition Chapman & Hall/CRC Texts in Statistical Science, retrieved from Internet URL: https://www.amazon.com/gp/product/0412357003/ref=dbs_a_def_rwt_hsch_vapi_taft_p1_i0 (1 page).

* cited by examiner

DETERMINATION OF ILLUMINATOR OBSTRUCTION BY KNOWN OPTICAL PROPERTIES

BACKGROUND

Autonomous vehicles include one or more devices for detecting a scene surrounding the vehicle. The vehicle autonomously controls its steering, braking, acceleration, etc., based on the detected scene. As one example, the vehicle may include one or more image sensors, e.g., near-field cameras.

The vehicle may include an illuminator for illuminating the field of view of the image sensor. The illuminator may emit light that is not visible to the human eye, e.g., infrared light. The illuminator includes a light source that generates the light, e.g., a light emitting diode (LED). The illuminator may also include a lens that protects the light source and other components of the illuminator from obstructions, e.g., dirt, dust, mud, rain, snow, etc. Light is emitted from the light source through the lens to the field of view of the image sensor.

Current methods are known for determining obstructions on lens of the image sensor and cleaning the identified obstructions. However, obstructions on the lens of the illuminator decreases the amount of generated light that reaches the field of view and degrades image quality. There remains in an opportunity to account for obstructions on the lens of the illuminator.

DETAILED DESCRIPTION

Figure 1:
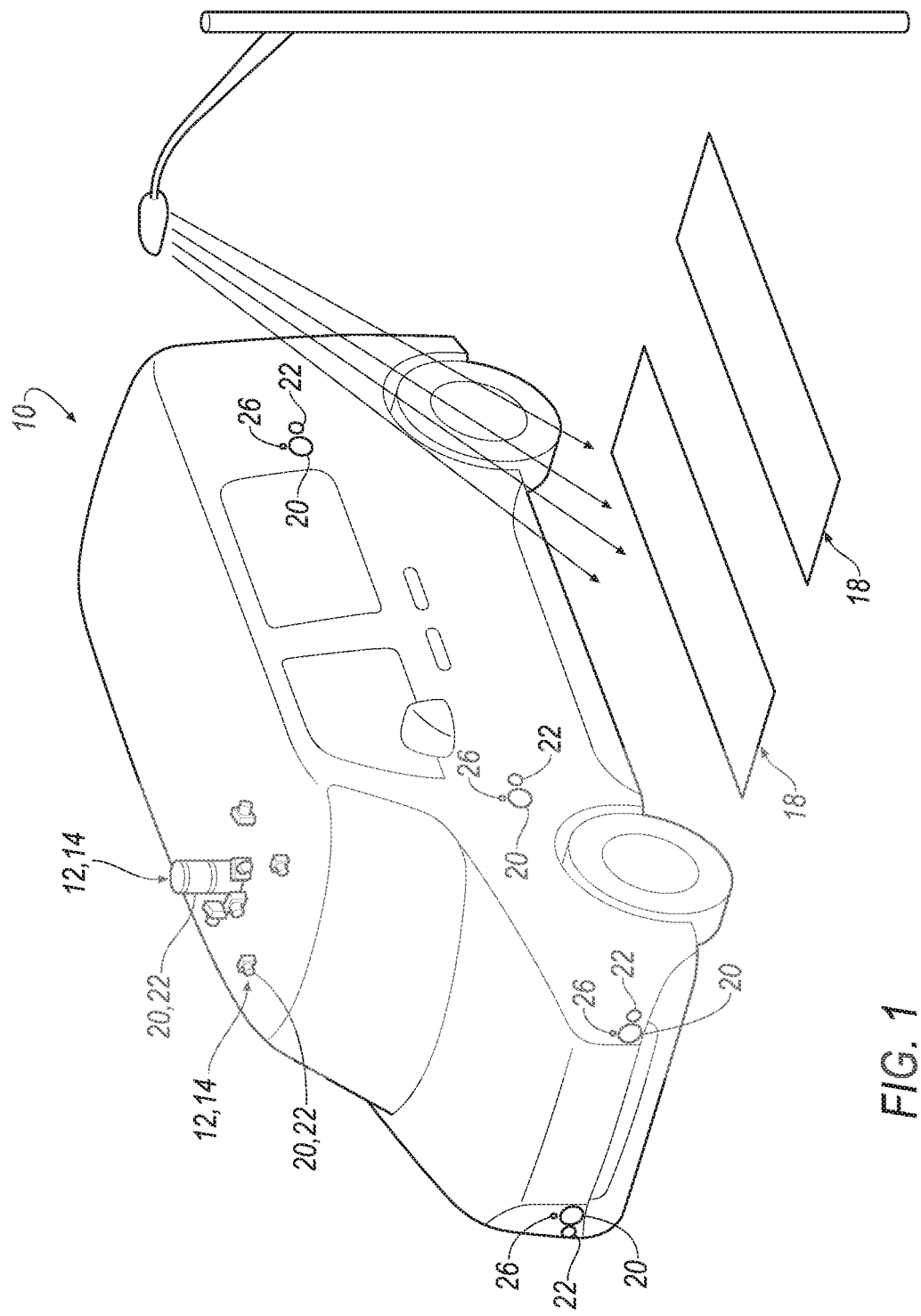
FIG. 1 is a perspective view of a vehicle including an image sensor and an illuminator with the illuminator unpowered and with a street lamp emitting light.

A vehicle includes an image sensor having a field of view, an illuminator aimed at the field of view, and a computer including a processor and a memory storing instructions executable by the processor. The instructions are executable by the processor to illuminate an object external to the vehicle; determine that the object has a known optical property; determine the optical property of the object from a database; calculate luminance of the illuminator based at least on the optical property of the object; and adjust at least one of the illuminator, the image sensor, and the computer based at least on the luminance of the illuminator.

The memory may store further instructions executable to adjust the illuminator by cleaning a lens of the illuminator based at least on the luminance of the illuminator. The memory may store further instructions executable to spray fluid at the lens to clean the lens.

The memory may store further instructions executable to compare the luminance of the illuminator with a threshold and to adjust at least one of the illuminator, the image sensor, and the computer when the luminance is below the threshold.

The memory may store further instructions executable to determine the geometry of the object and to determine a type of the object based on the geometry.

The memory may store further instructions executable to determine the shape of the object and to calculate the luminance of the illuminator based at least on the shape.

The memory may store further instructions executable to determine the distance between the object and the illuminator and/or the orientation of the object relative to the illuminator and to calculate the luminance of the illuminator based at least on the distance and/or orientation.

The memory may store further instructions executable to capture an image the object during the illumination.

A system may include a computer including a processor and a memory, the memory storing instructions executable by the processor to illuminate an object external to a vehicle with an illuminator; determine that the object has a known optical property; determine the optical property of the object from a database; calculate luminance of the illuminator based at least on the optical property of the object; and clean a lens of the illuminator based at least on the luminance of the illuminator.

The memory may store further instructions executable to spray fluid at the lens to clean the lens.

The memory may store further instructions executable to compare the luminance of the illuminator with a threshold and to clean the lens of the illuminator when the luminance is below the threshold.

The memory may store further instructions executable to determine the geometry of the object and to determine a type of the object based on the geometry of the object.

The memory may store further instructions executable to determine the shape of the object relative to the illuminator and to calculate the luminance of the illuminator based at least on the shape.

The memory may store further instructions executable to determine the distance between the object and the illuminator and/or the orientation of the object relative to the illuminator and to calculate the luminance of the illuminator based at least on the distance and/or orientation.

A method includes illuminating an object; determining the that the object has a known optical property; determining the optical property of the object from a database; calculating luminance of the illuminator based at least on the optical property of the object; and adjusting at least one of the illuminator, an image sensor, and a computer based at least on the luminance of the illuminator.

Adjusting the illuminator may include cleaning a lens of the illuminator.

Determining a type of the object may include determining the geometry of the object.

The method may include comparing the luminance of the illuminator with a threshold and cleaning the illuminator when the luminance is below the threshold.

The method may include determining the shape of the object and calculating the luminance of the illuminator based at least on the shape.

The method may include determining the distance between the object and the illuminator and/or the orientation of the object relative to the illuminator and calculating the luminance of the illuminator based at least on the distance and/or orientation.

With reference to the Figures, wherein like numerals indicate like parts throughout the several views, a vehicle 10 includes a system including an image sensor 12 having a field of view and an illuminator 14 aimed at the field of view. The system of the vehicle 10 includes a computer 16 having a processor and a memory storing instructions executable by the processor. The computer 16 is programmed to illuminate an object 18 external to the vehicle 10, determine that the object 18 has a known optical property, determine the optical property of the object 18 from a database, calculate luminance of the illuminator 14 based at least on the optical property of the object 18, and adjust at least one of the illuminator 14, the image sensor 12, and the computer 16 based at least on the luminance of the illuminator 14.

The optical property of various objects 18 and/or various types of object 18 may be predetermined and stored in the database, as described below. After determining that the object 18 has a known optical property, e.g., based on the image of the object 18 and/or an HD map, the database is accessed to determine the optical property of the object 18, e.g., as described below, object detection from sensor data and/or localization and HD map data, etc. That optical property is then used to calculate the luminance of the illuminator 14. In other words, the luminance of the illuminator 14 is calculated based on the known optical property (e.g., diffuse reflectivity, retro-reflectivity, and specular reflectivity components) of the type of the object 18. As discussed below, the position and/or orientation of the object 18 relative to the light sensor 12 and/or illuminator 14 may also be used to calculate the luminance of the illuminator 14. This calculation of the luminance of the illuminator 14 may then be used to determine if the system should be adjusted due to a blockage of the illuminator 14, e.g., an obstruction on a lens 20 of the illuminator 14. As one example, the lens 20 of the illuminator 14 may be cleaned.

The vehicle 10 may be any type of passenger or commercial automobile such as a car, a truck, a sport utility vehicle, a crossover vehicle, a van, a minivan, a taxi, a bus, etc. The vehicle 10 may be an autonomous vehicle. A computer can be programmed to operate the vehicle 10 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

Figure 2:
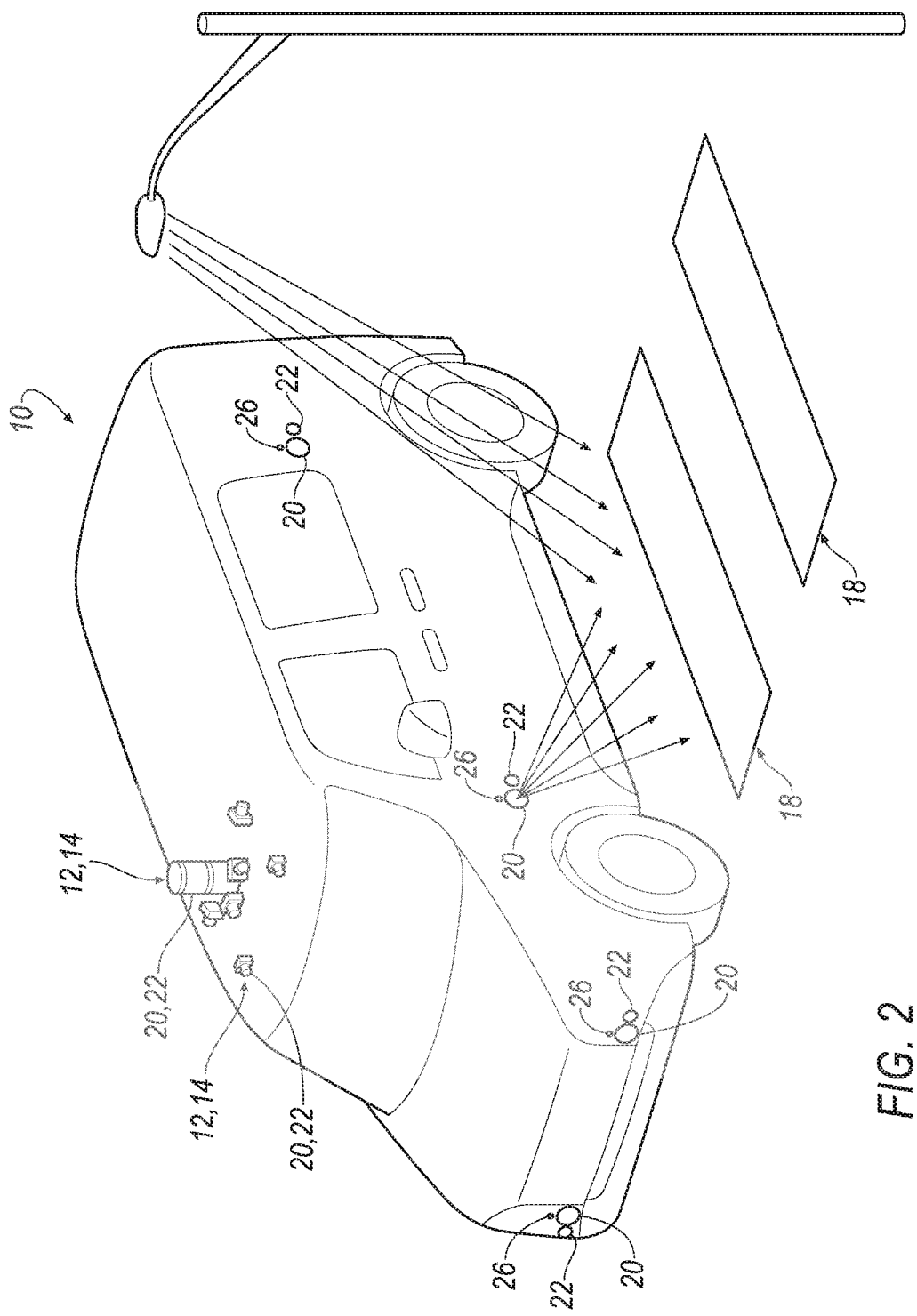
FIG. 2 is a perspective view of the vehicle with the illuminator at full power.
Figure 3:
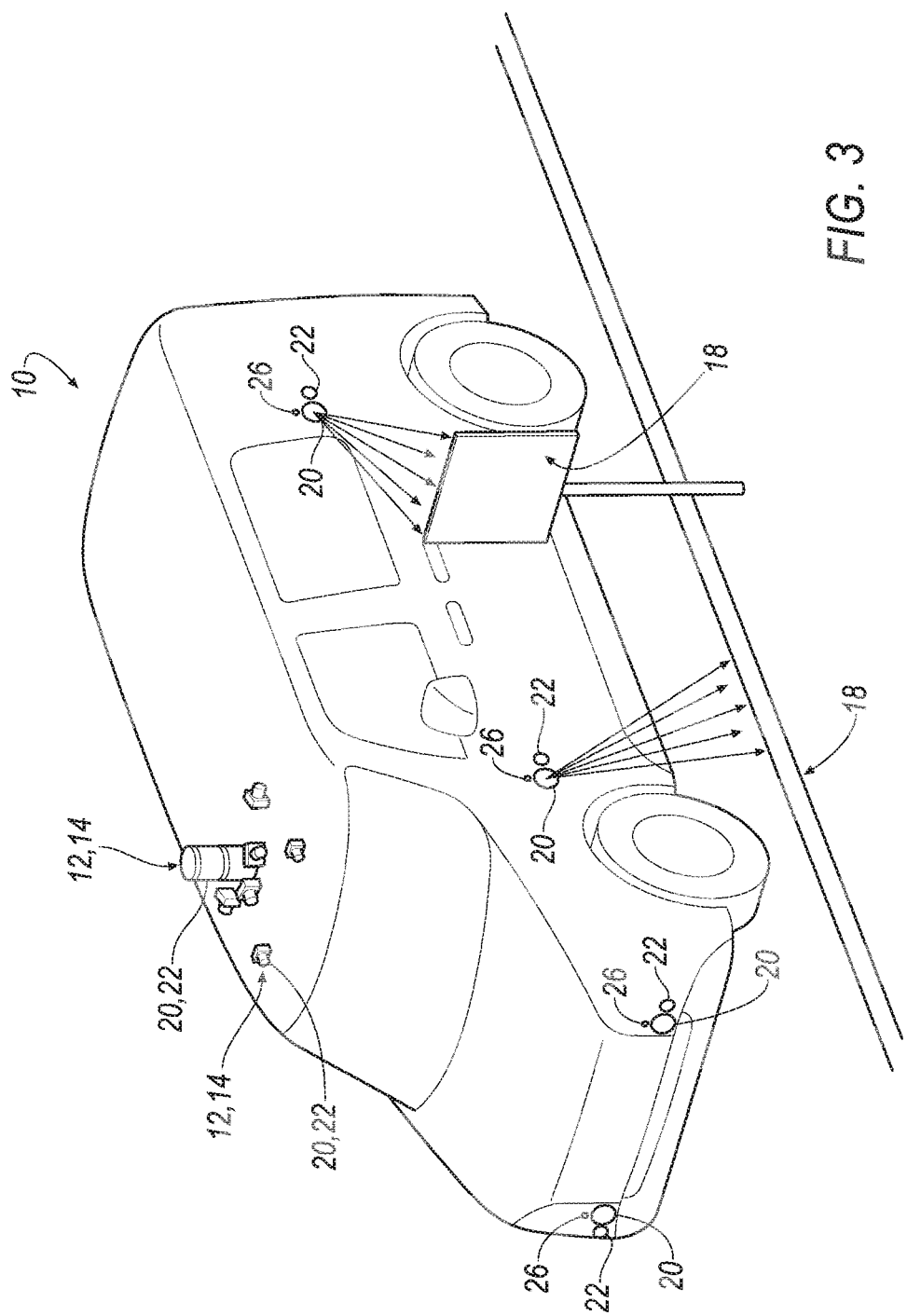
FIG. 3 is a perspective view of the vehicle with one illuminator illuminating a lane marker and another illuminator illuminating a road sign.

The vehicle 10 includes the image sensor 12 having a field of view and an illuminator 14 aimed at the field of view. The image sensor 12 and the illuminator 14 may be adjacent to each other, as shown in FIGS. 1-3, or may be spaced from each other. The illuminator 14 has a lens 20 and the image sensor 12 has a lens 22. The lens 20 of the illuminator 14 and the lens 22 of the image sensor 12 may be separate from each other. As another example, the image sensor 12 and the illuminator 14 may share a common lens (identified with 20, 22 in FIGS. 1-3). The image sensor 12 and/or illuminator 14 may be at any suitable location on the vehicle 10, e.g., a side body panel, roof, etc.

The image sensor 12 may be any type of image sensor. As one example, the image sensor 12 may be a digital camera, for example, a near-field camera. As other examples, the image sensor 12 may be lidar sensor (e.g., flash lidar), time-of-flight camera, etc. The image sensor 12 is configured to capture an image of the scene exterior to the vehicle 10.

The illuminator 14 is configured to illuminate the scene exterior to the vehicle 10 to illuminate the image captured by the image sensor 12. The illuminator 14 may, for example, emit infrared light. The illuminator 14 has a light source that may be, for example an LED light source. The illuminator 14 may emit light constantly or may emit flashes of light, e.g., for a flash lidar. The illuminator 14 may emit a known pattern of light and, in such an example, may be spaced from the image sensor 12, i.e., at a different viewpoint. In other words, the illuminator 14 may emit structured light. The illuminator 14 may be configured to illuminate objects 18 in the scene exterior to the vehicle 10, e.g., road signs, lane markers, street signs, trees, grass, bushes, and the image sensor 12 is configured to capture an image of the scene illuminated by the illuminator 14.

Figure 4:
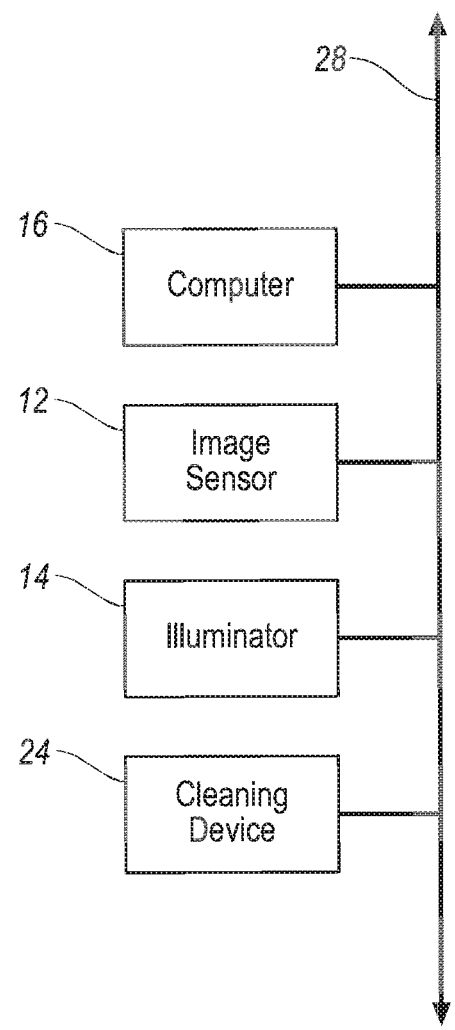
FIG. 4 is a block diagram of a system of the vehicle.

The vehicle 10 may include a cleaning device 24 (FIG. 4) for cleaning the lens 20 of the illuminator 14. The cleaning device 24 may include a nozzle 26 (FIGS. 1-3) aimed at the illuminator 14. The nozzle 26 is shown in some examples in FIGS. 1-3, and a nozzle 26 may be aimed at one or all of the illuminators 14. A nozzle 26 may be dedicated to one illuminator 14 or may be shared by multiple illuminators 14. The nozzles 26 shown in FIGS. 1-3 are on the vehicle body. As other examples, the nozzle 26 may be incorporated into a sensor housing, e.g., a housing that houses the image sensor 12 and/or the illuminator 14. The nozzle 26 may spray fluid, e.g., cleaning fluid and/or air, at the lens 20 of the illuminator 14 to clean the lens 20. The cleaning device 24 may include any suitable pump, reservoir, controller, etc., for selectively cleaning the lens 20 when instructed by the computer 16, as described below.

The vehicle 10 includes a communication network 28 including hardware, such as a communication bus, for facilitating communication among vehicle components. The communication network 28 may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 16, implemented via circuits, chips, or other electronic components, is included in the vehicle 10 for carrying out various operations, including as described herein. The computer 16 is a computing device that generally includes a processor and a memory, the memory including one or more forms of computer-readable media, and storing instructions executable by the processor for performing various operations, including as disclosed herein. The memory of the computer 16 further generally stores remote data received via various communications mechanisms; e.g., the computer 16 is generally configured for communications on a controller area network (CAN) bus or the like, and/or for using other wired or wireless protocols, e.g., Bluetooth, etc. The computer 16 may also have a connection to an onboard diagnostics connector (OBD-II). Via the communication network using Ethernet, WiFi, the CAN bus, Local Interconnect Network (LIN), and/or other wired or wireless mechanisms, the computer 16 may transmit data and messages to various devices in the vehicle 10 and/or receive data and messages from the various devices, including as described below.

The computer 16 is programmed to initiate the steps to calculate the luminance of the illuminator 14. In other words, the computer 16 is programmed to trigger the system and method. The computer 16 may determine, based on inputs, that the steps to calculate the luminance should be initiated or may receive instructions to initiate.

The initiation may be based on distance traveled interval, time interval, or based on some image feature or change thereof. For example, the image quality of the image sensor 12 may be determined by known methods, i.e., known algorithms, and the results of such an image algorithm may be tracked over time and/or compared to a baseline. For example, the image quality may be tracked over time using a known statistical process control/tracking method. The processor may be programmed to initiate based on changes in image quality, e.g., degradation in image quality.

As another example, the initiation may be based on detection of an object 18 by the computer 16 (i.e., based on input from the image sensor 12). In other words, when the computer 16 identifies an object 18 as an object for which an optical property is known, the computer 16 may initiate the steps to calculate luminance of the illuminator 14.

As another example, the initiation may be based on cross reference with a high definition (HD) map to identify known objects 18 and to initiate based on proximity to approaching objects 18 on the HD map. As is known, an HD map is a digital map for autonomous navigation and includes layers of information (such as semantic objects such as road signs, lane markers, street signs, trees, grass, bushes, other vehicles, etc.) on a geometric map. The layers of information may be a combination of information sourced from several autonomous vehicles to create a real-time map.

The computer 16 is programmed to image the scene around the vehicle 10, i.e., external to the vehicle 10. Specifically, the computer 16 is programmed to image the scene around the vehicle 10 with varying illuminator light levels. Varying the illuminator light levels of the images allows for ambient light to be subtracted to determine the luminance of the illuminator 14, as described further below. As an example, the scene may be imaged with no illumination from the illuminator 14 (i.e., the illuminator 14 at 0%) and may be imaged with full illumination from the illuminator 14 (i.e., the illuminator 14 at 100%). In other words, at least one image is taken by the image sensor 12 with no illumination from the illuminator 14 and at least one image is taken by the image sensor 12 at full illumination from the illuminator 14. In addition, or in the alternative, the scene may be imaged at levels between 0% and 100%. The imaging may occur at low vehicle speed or when the vehicle 10 is stopped or, as another example, multiple images may be fused together to avoid errors due to the shift in the image during movement of the vehicle 10. As another example, the computer 16 may strobe the illuminator 14 and use a rolling shutter to create a single "image" where each illumination level is a separate row of the image.

Imaging the scene includes imaging objects 18 in the scene. As set forth above, the objects 18 may be, for example, road signs, lane markers, street signs, trees, grass, bushes, other vehicles, etc.). The illumination of the scene by the illuminator 14 includes illuminating an object 18 external to the vehicle 10.

The computer 16 is programmed to determine that the object 18 has a known optical property, i.e., an optical property that may be accessed from a database. As one example, the computer 16 is programmed to determine the type of one or more objects 18 in the image for which an optical property, e.g., reflectivity, is known. The optical property is then used to determine the luminance of the illuminator 14, as described further below.

For example, the computer 16 is programmed to determine the geometry of the object 18 and to identify the object 18 (e.g., on an HD map) and/or to determine the type of the object 18 based on the geometry (e.g., by object detection in the image). The geometry of the object 18 includes the shape of the object 18 in the image, the distance between the object 18 and the illuminator 14 and/or image sensor 12, the orientation of the object 18 relative to the illuminator 14 and/or image sensor 12.

The image of the scene taken by the image sensor 12, i.e., the sensors (CMOS, CCD, etc.) of the image sensor 12, may be interpreted by one or more other sensor or knowledge and/or algorithm to construct an approximate model of the scene or at the least one or more objects 18 imaged. The model of the scene may include geometry of the scene, i.e., shapes of objects 18, distances between objects 18 and the illuminator 14 and/or image sensor 12, orientation of the object 18 relative to the illuminator 14 and/or image sensor 12. This geometry may be accomplished by the use of structure from motion techniques; depth maps based on monocular camera through the use of neural networks; recognition of 3D objects and their orientation in space through use of neural networks; depth maps based on monocular camera structure from motion or visual slam; sensor fusion from another sensor such as Lidar, Radar, ultra-sonic; incorporation of image recognition fused with HD maps or simpler logic (e.g., a road surface is flat, lane marker lies on road, and vehicle 10 is approximately perpendicular to ground plane); stereo imaging; and/or time of flight camera, etc.

Based on this geometry, the computer 16 is programmed to identify the object 18 and/or to determine the type of the object 18 based on the image of the object 18. As one example, the model of the scene and the ways of constructing the model described above may determine the type of the object 18, e.g., based at least on the shape of the object 18 in the image. As another example, the object 18 may be identified by the use of an HD map along with location identification of the vehicle 10, i.e., location of the vehicle 10 on the HD map. For example, the HD map may identify an object 18 and the proximity of the vehicle 10 to the object 18 may be known so that the system may image the scene when the object 18 is in the field of view of the image sensor 12.

The computer 16 is programmed to determine the shape of the object 18; the distance between the object 18 and the illuminator 14 and/or image sensor 12; and/or the orientation of the object 18 relative to the illuminator 14 and/or the image sensor 12. The computer 16 is programmed to calculate the luminance of the illuminator 14 based at least on the shape, the distance, and/or the orientation. For example, the processor may use the shape, distance, and/or orientation to identify the object 18 and/or determine the type of the object 18, as described above. In the addition, or in the alternative, the processor may use the shape, distance, and/or orientation in the calculation of the illuminance described below.

The computer 16 is programmed to determine the optical property of the object 18 and/or the type of the object 18. As an example, the computer 16 is programmed to determine the optical property of the object 18 and/or the type of the object 18 from a database. The database may be a lookup table, e.g., on the memory of the computer 16, that includes optical properties for various types of objects 18. As another example, the database may be a database on an HD map. For example, the computer 16 may be programmed to image the scene when in the vicinity of an object 18 based on the HD map as described above, identify the type of the object 18 in the image as the type identified in the HD map, and access the optical property of that object 18 from the HD map. In such an example, the optical property of that specific object 18 may be continuously updated in the HD map based on input from other autonomous vehicles that have imaged the object 18. As another example the computer 16 may be programmed to identify the object 18 in the image as an object identified in the HD map, i.e., based on geometry and location of the vehicle, and access the optical property of that object 18 from the HD map.

In particular, objects 18 that may be identified by type as described above, e.g., road signs, lane markers, street signs, trees, grass, bushes, other vehicles, etc., may have known optical properties, e.g., reflection (specular, diffuse, retro reflection), absorption percentages, and geometric attributes (distance, relative direction), etc. This may be cross referenced to the specific wavelength of the illuminator 14, time of year (winter vs summer), HD Maps (new vs old lane markers), and other factors. This information is used in the calculation of the luminance of the illuminator 14 as described below.

As another example, in the event the object 18 is another vehicle, the database may be on the other vehicle or updated by the other vehicle. For example, vehicles and/or infrastructure in their V2X (vehicle-to-everything) communication may include and/or transmit this information. For example, a black vehicle might indicate it has a 10% diffuse reflectance, 2% retro reflection, and 5% specular reflection. The vehicle may be identified in the imaging and type recognition described above and the optical property is transmitted via V2X and these two pieces of information may be tied together to determine the optical property of the object 18 being imaged, i.e., the black vehicle.

The computer 16 is programmed to calculate the luminance of the illuminator 14 based at least on the optical property of the object 18. In addition, the computer 16 is programmed to determine the distance between the object 18 and the illuminator 14 and/or the orientation of the object 18 relative to the illuminator 14 and to calculate the luminance of the illuminator 14 based at least on the distance and/or orientation.

Specifically, the computer 16 is programmed to calculate the luminance of the illuminator 14 based on the known physical attributes of the image sensor 12 (e.g., exposure time, analog to digital gain, F-stop, vignetting, QE, focal length, F-stop, camera calibration sensitivity, FOV, orientation, position (relative and absolute), etc.) and the illuminator 14 (e.g., wavelength, luminesce vs power (V, I), position, orientation, Intensity of light source as a function of distance and angle from the light (see graph below in technical background, etc.). The computer 16 may be programmed to account for weather based on absorption of light, e.g., fog.

The computer 16 is programmed to calculate the luminesce of the illuminator 14 based on a sub-region of the image in which the object 18 with known geometry and optical properties is segmented and analyzed through use of the equation below. The intensity of that region may be analyzed. If a large variation is found, then the object 18 may be further sub-divided. The computer 16 may be programmed to account for dark current noise in the image when an object is at a distance where the dark current noise in the image is comparable to the signal.

Given the calibration information, previously obtained geometry, image sequence at varying illuminator power levels, and determined optical properties, the luminance of the illuminator 14 may be calculated in the following equation:

$$\text{Luminance} = (4^2\pi^2 r^4 * r_{diffuse}(\theta) + 4^1\pi^1 r^2 * \text{specural}(\theta) + 4^1\pi^1 r^2 * \text{retro\_reflective}) * \\ f_{LED}(\theta) * f_{obj}(\theta) * f_{lens}(\theta) * \frac{N_{d,100\%}}{K_c}\left(\frac{f_s^2}{tS}\right) - \frac{N_{d,0\%}}{K_c}\left(\frac{f_s^2}{tS}\right)$$

where:
r=distance between object 18 and image sensor 12 and/or illuminator 14;
$r_{diffuse}(\theta)$=known diffuse reflection value of an object 18;
specular($\theta$)=known specular reflection value of an object 18;
retro_reflective=known retroreflective value of an object 18;
$f_{LED}(\theta)$=function of illuminator lens 20;
$f_{obj}(\theta)$=function of object 18;
$f_{lens}(\theta)$=function of image sensor lens 22;
$N_d$=digital number (value) of the pixel in the image;
$K_c$=calibration constant for the image sensor 12;
t=exposure time (seconds);
$f_s$=aperture number (f-stop);
S=ISO sensitivity;
$L_s$=luminance of the scene (candela/meter$^2$).

It may be assumed in some instances that r is approximately equal. It can also be assumed that the behavior of intensity of the light source propagating in space to the object 18 and back to the image sensor 12 follows a point spread function with a modification of the function, f($\theta$), which can account for the illuminator lens 20, object 18, and image sensor lens 22 orientation functionality. For example, the illuminator 14 may have strong orientation dependence and the image sensor 12 may experience vignetting effects depending on the relative orientations and the image sensor 12 image signal processing corrections. The reflection is accounted for as diffuse and may be determined based on the object 18 and its reflectance in the spectral regime of the light source. The latter portion of the equation above determines the luminance of the object 18 based on the calibration of the image sensor 12 minus the effect of ambient light luminance. The solution of the above equation calculates the luminance of the illuminator 14. The term "specular($\theta$)" in the equation above corrects for specular reflection if the object 18 is so correctly placed within the scene relative to the illuminator 14 and the image sensor 12. It can be assumed that this term is normally zero and can be dropped from the equation for most objects 18 sampled. The term "retro_reflective" in the equation above is the magnitude of the retro reflective effect multiplied by the illuminator's 14 diffuse light emission at impact to the object 18. Further corrections can be added to account for spectral properties of the illuminator 14, object 18, and image sensor 12. Further sections of the object's pixels that may be affected by specular reflection from the illuminator 14 or other light sources may be removed to simplify the calculation in an object 18 with varying intensity across the sub-region.

The calculation above calculates a numerical value for the percentage decrease of the illuminator 14. Thus, the degree of degradation is quantified and appropriate action may be taken based on this information, as described above.

The computer 16 is programmed to determine if the luminance of the illuminator 14 luminance is lower than expected and/or needed. The relative low luminance may be caused by a blockage, e.g., on the lens 20 of the illuminator 14, and/or failure of the illuminator 14, e.g., LED failure. As an example, the computer 16 is programmed to compare the luminance of the illuminator 14 with a threshold. Specifically, the processor may be programmed to use a statistical process control and/or tracking method to compare and identify changes in the luminance. The imaging at no illumination and full illumination and calculating the luminance of the illuminator 14 on the optical property may be repeated for varying scenes over time to determine a shift. The processor may also cross-reference the specific object 18 with a database, e.g., from an HD map, to account for changes, e.g., new lane markers, or degradation over time.

The computer 16 is programmed to adjust the system based on the luminance of the illuminator 14 being lower than expected and/or needed. For example, the computer 16 is programmed to adjust at least one of the illuminator 14, the image sensor 12, and the computer 16 when the luminance is below the threshold. As an example, the adjustment may be an adjustment of the illuminator 14 by cleaning a lens 20 of the illuminator 14. For example, fluid such as cleaning liquid and/or air may be sprayed at the lens 20 of the illuminator 14 to clean the lens 20. The processor may be programmed to instruct a cleaning device 24 to clean the lens 20 in such a case. The processor may be programmed to verify that the lens 20 is clean by repeating the calculation of the luminance described above. Other examples of adjusting the system may include logging the results for future use, scheduling maintenance (including instructing the vehicle 10 to drive to a service provider for maintenance), disabling the system (e.g., disabling the image sensor 12 and/or illuminator 14), and/or modifying sensor fusion and perception algorithms/logic to account for a lower luminance. In examples where the lens 20, 22 is shared by the image sensor 12 and the illuminator 14, the entire lens 20, 22 may be cleaned or only a portion of the lens 20, 22 through which the illuminator 14 is aimed may be cleaned. As another example, the image sensor 12, e.g., in examples in which the image sensor 12 is a camera, may take longer exposures to obtain an improve quality image with sufficient image exposure assuming that the degradation is limited and the dark current noise of the image sensor 12 does not dominate in long exposures.

Figure 5:
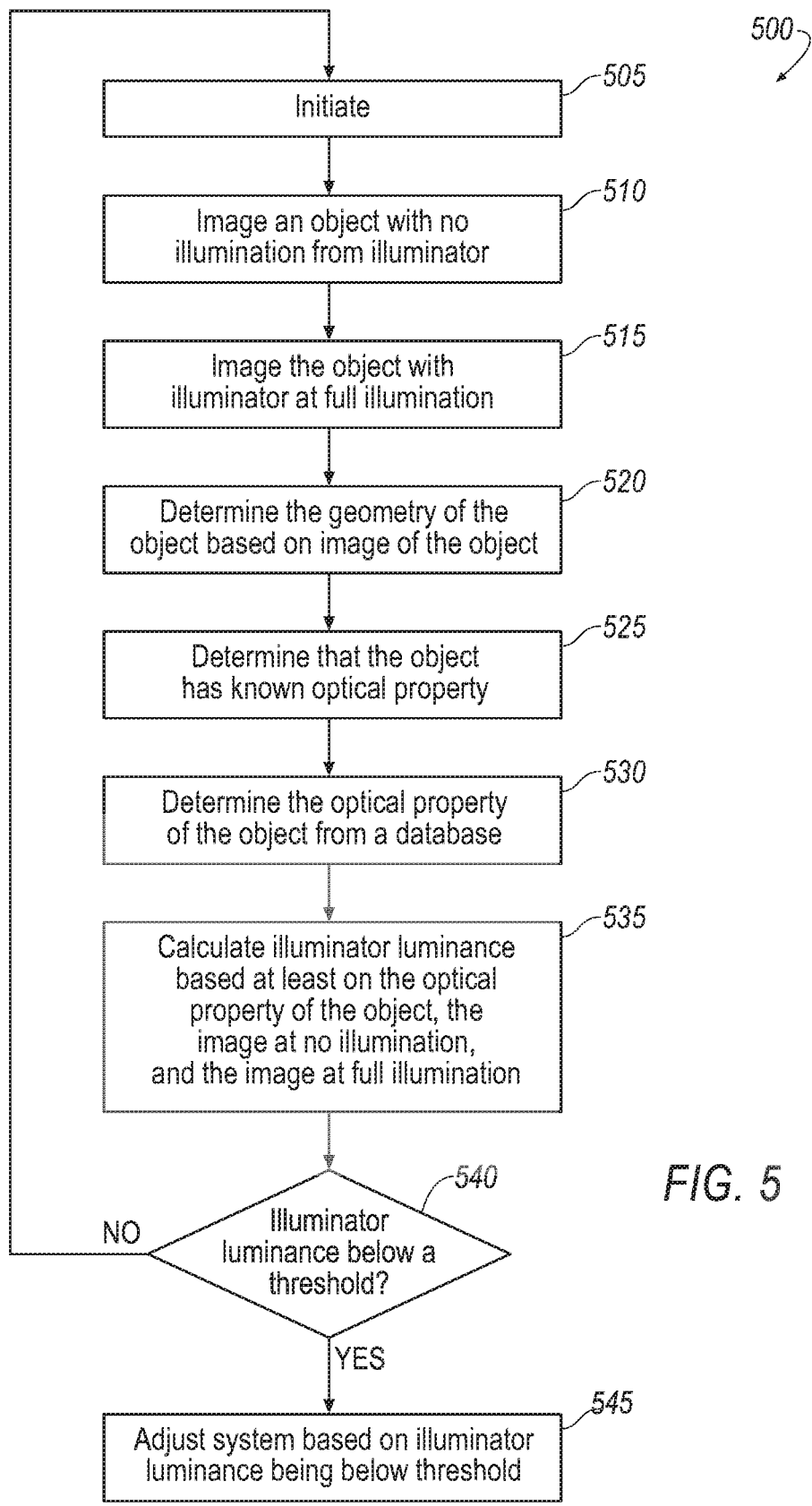
FIG. 5 is a flow chart of a method performed by the system.

A method 500 of operating the examples shown in FIGS. 1-4 is shown in FIG. 5. The computer 16 may be programmed to perform the method shown in FIG. 5.

With reference to block 505, the method 500 includes initiating the steps to calculate the luminance of the illuminator 14, i.e., triggering the system and method 500. Block 505 may include determining, based on inputs, that the steps to calculate the luminance should be initiated and/or receiving instructions to initiate. For example, block 505 may include calculating or receiving a distance traveled interval, a time interval, or some image feature or change thereof and initiating the system and method 500 based that information. For example, the method 500 in block 505 may include determining the image quality of the image sensor 12 by known methods, i.e., known algorithms, and the results of such an image algorithm may be tracked over time and/or compared to a baseline. For example, the method may include tracking the image quality over time using a known a statistical process control and/or tracking method. As another example, the method may include cross-referencing a high definition (HD) map to identify known objects 18 and to initiate based on proximity to approaching objects 18 on the HD map.

With reference to blocks 510 and 515, the method includes imaging the scene around the vehicle 10. Specifically, the method includes varying illuminator light levels. In the examples in blocks 510 and 515, the method includes imaging the scene with no illumination from the illuminator 14 (block 510) and with full illumination from the illuminator 14 (block 515). In other words, block 510 includes imaging the scene with the image sensor 12 and block 515 includes both illuminating the scene with the illuminator 14 and imaging the scene with the image sensor 12. In addition, or in the alternative, the method may include imaging the scene at levels between 0% and 100%. The method may include imaging at low vehicle speed or when the vehicle 10 is stopped. As another example, the method may include fusing multiple images together to avoid errors due to the shift in the image during movement of the vehicle 10. Illuminating the scene includes illuminating one or more object 18 in the scene and imaging the scene includes imaging the object 18.

The method includes determining the geometry of the object 18 (block 520) and determining that the object has a known optical property (block 525). This may be based on the geometry based on the image of the object 18, i.e., the image taken at block 510 and/or the image taken at block 515. Specifically, the method at block 520 may include calculating and/or receiving a measurement of distance between the object 18 and the illuminator 14 and/or image sensor 12, geometry of the object 18, orientation of the object 18 relative to the illuminator 14 and/or image sensor 12, relative position from illuminator 14 and/or image sensor 12, and/or other information. The method at block 520 and/or block 525 includes interpreting the image of the scene taken by the image sensor 12 by one or more other sensor or knowledge and/or algorithm and constructing an approximate model of the scene or at the least one or more objects 18 imaged, as described above. For example, the computer 16 is programmed to determine the geometry of the object 18 and to identify the object 18 and/or determine the type of the object 18 based on the geometry. Specifically, the method at block 520 and/or block 525 includes interpreting the image of the scene taken by the image sensor 12 by one or more other sensor or knowledge and/or algorithm to construct an approximate model of the scene or at the least one or more objects 18 imaged, as described above.

The method at block 525 includes identifying the object 18 and/or determining the type of the object 18 based on the image of the object 18. The method may include determining the type of the object 18 based at least on the shape of the object 18. As one example, the model of the scene and the ways of constructing the model described above may identify the object 18 and/or determine the type of the object 18. As another example, the object 18 may be identified by the use of an HD map along with location identification of the vehicle 10, i.e., location of the vehicle 10 on the HD map. For example, the HD map may identify and object 18 and proximity of the vehicle 10 to the object 18 so that the system may image the scene when the object 18 is in the field of view of the image sensor 12.

With reference to block 530, the method includes determining the optical property of the type of the object 18 after identification of the object 18 and/or determination of the type as described above. As an example, the method includes determining the optical property of the object 18 or the type of the object 18 from a database, as described above. For example, the method may include accessing a lookup table, e.g., on the memory of the computer 16, that includes optical properties for various types of objects 18. As another example, the method may include imaging the scene when in the vicinity of an object 18 based on the HD map as described above, identifying the type of the object 18 in the image as the type identified in the HD map, and accessing the optical property of that object 18 from the HD map. As another example, the method may include accessing the optical property by V2X communication as described above.

With reference to block 535, the method includes calculating the luminance of the illuminator 14 based on the optical property (i.e., based on the object 18 and/or the type of the object 1, the image at no illumination, and the image at full illumination. Specifically, the calculation based on the object 18 and/or the type of the object 18 may include calculating based on the optical property of the object 18 and/or the type of the object 18. In addition, the method may include determining the distance between the object 18 and the illuminator 14 and/or the orientation of the object 18 relative to the illuminator 14 and calculating the luminance of the illuminator 14 based at least on the distance and/or orientation. The method of calculating the luminance may include implementation of the calculation set forth above.

The method may include calculating the luminance based on a sub-region of the image in which the object 18 with known geometry and optical properties is segmented and analyzed through use of the equation below. The intensity of that region may be analyzed. If a large variation is found, then the object 18 may be further sub-divided.

With reference to decision box 540, the method includes determining if the luminance of the illuminator 14 luminance is lower than expected and/or needed. As an example, the method includes comparing the luminance of the illuminator 14 (as calculated above) with a threshold. Specifically, the method may compare and identify changes in the luminance by using statistical process control and/or tracking. The method may include repeating the imaging at no illumination and full illumination and calculating of the luminance of the illuminator 14 based on the optical property for varying scenes over time to determine a shift. The method may include cross-referencing the specific object 18 with a database, e.g., from an HD map, to account for changes, e.g., new lane markers, or degradation over time.

With reference to box 545, the method includes adjusting the system based on the luminance of the illuminator 14 being lower than expected and/or needed. For example, the method includes adjusting at least one of the illuminator 14, the image sensor 12, and the computer 16 when the luminance is below the threshold. As an example, the method includes cleaning a lens 20 of the illuminator 14, e.g., spraying fluid such as cleaning liquid and/or air at the lens 20 of the illuminator 14 to clean the lens 20. In such a case, the method may including verifying that the lens 20 is clean by repeating the calculation of the luminance described above. Other examples of adjusting the system may include logging the results for future use, scheduling maintenance, modifying sensor fusion and perception algorithms/logic to account for a lower luminance. As another example, the image sensor 12 may take longer exposures to obtain an improve quality image with sufficient image exposure assuming that the degradation is limited and the dark current noise of the image sensor 12 does not dominate in long exposures. As another example, the image sensor 12, e.g., in examples in which the image sensor 12 is a camera, may take multiple varying exposures to obtain a high dynamic range image with sufficient image intensity range.

With regard to the process 500 described herein, it should be understood that, although the steps of such process 500 have been described as occurring according to a certain ordered sequence, such process 500 could be practiced with the described steps performed in an order other than the order described herein. It further should be understood that certain steps could be performed simultaneously, that other steps could be added, or that certain steps described herein could be omitted. In other words, the description of the process 500 herein is provided for the purpose of illustrating certain embodiments and should in no way be construed so as to limit the disclosed subject matter.

Computing devices, such as the computer 16, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Python, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A vehicle comprising:
an image sensor having a field of view;
an illuminator aimed at the field of view; and
a computer including a processor and a memory storing instructions executable by the processor to:

illuminate an object external to the vehicle;
determine that the object has a known optical property;
determine the optical property of the object from a database;
calculate luminance of the illuminator based at least on the optical property of the object; and
adjust at least one of the illuminator, the image sensor, and the computer based at least on the luminance of the illuminator.

2. The vehicle as set forth in claim 1, wherein the memory stores further instructions executable to adjust the illuminator by cleaning a lens of the illuminator based at least on the luminance of the illuminator.

3. The vehicle as set forth in claim 2, wherein the memory stores further instructions executable to spray fluid at the lens to clean the lens.

4. The vehicle as set forth in claim 1, wherein the memory stores further instructions executable to compare the luminance of the illuminator with a threshold and to adjust at least one of the illuminator, the image sensor, and the computer when the luminance is below the threshold.

5. The vehicle as set forth in claim 1, wherein the memory stores further instructions executable to determine the geometry of the object and to determine a type of the object based on the geometry.

6. The vehicle as set forth in claim 1, wherein the memory stores further instructions executable to determine the shape of the object and to calculate the luminance of the illuminator based at least on the shape.

7. The vehicle as set forth in claim 1, wherein the memory stores further instructions executable to determine the distance between the object and the illuminator and/or the orientation of the object relative to the illuminator and to calculate the luminance of the illuminator based at least on the distance and/or orientation.

8. The vehicle as set forth in claim 1, wherein the memory stores further instructions executable to capture an image the object during the illumination.

9. A system, comprising a computer including a processor and a memory, the memory storing instructions executable by the processor to:
illuminate an object external to a vehicle with an illuminator;
determine that the object has a known optical property;
determine the optical property of the object from a database;
calculate luminance of the illuminator based at least on the optical property of the object; and
clean a lens of the illuminator based at least on the luminance of the illuminator.

10. The system as set forth in claim 9, wherein the memory stores further instructions executable to spray fluid at the lens to clean the lens.

11. The system as set forth in claim 9, wherein the memory stores further instructions executable to compare the luminance of the illuminator with a threshold and to clean the lens of the illuminator when the luminance is below the threshold.

12. The system as set forth in claim 9, wherein the memory stores further instructions executable to determine the geometry of the object and to determine a type of the object based on the geometry of the object.

13. The system as set forth in claim 9, wherein the memory stores further instructions executable to determine the shape of the object relative to the illuminator and to calculate the luminance of the illuminator based at least on the shape.

14. The system as set forth in claim 9, wherein the memory stores further instructions executable to determine the distance between the object and the illuminator and/or the orientation of the object relative to the illuminator and to calculate the luminance of the illuminator based at least on the distance and/or orientation.

15. A method comprising:
illuminating an object;
determining the that the object has a known optical property;
determining the optical property of the object from a database;
calculating luminance of the illuminator based at least on the optical property of the object; and
adjusting at least one of the illuminator, an image sensor, and a computer based at least on the luminance of the illuminator.

16. The method as set forth in claim 15, wherein adjusting the illuminator includes cleaning a lens of the illuminator.

17. The method as set forth in claim 15, wherein determining a type of the object includes determining the geometry of the object.

18. The method as set forth in claim 15, further comprising comparing the luminance of the illuminator with a threshold and cleaning the illuminator when the luminance is below the threshold.

19. The method as set forth in claim 15, further comprising determining the shape of the object and calculating the luminance of the illuminator based at least on the shape.

20. The computer as set forth in claim 15, further comprising determining the distance between the object and the illuminator and/or the orientation of the object relative to the illuminator and calculating the luminance of the illuminator based at least on the distance and/or orientation.

* * * * *